(12) United States Patent
Zahn

(10) Patent No.: US 10,109,836 B2
(45) Date of Patent: *Oct. 23, 2018

(54) RECHARGEABLE BATTERY FOR HAND-GUIDED ELECTROMECHANICAL TOOLS

(71) Applicant: Robert Bosch GmbH, Stuttgart (DE)

(72) Inventor: Wolf Zahn, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 168 days.

This patent is subject to a terminal disclaimer.

(21) Appl. No.: 14/144,713

(22) Filed: Dec. 31, 2013

(65) Prior Publication Data

US 2014/0113179 A1 Apr. 24, 2014

Related U.S. Application Data

(63) Continuation of application No. 12/668,600, filed as application No. PCT/EP2008/056043 on May 16, 2008, now Pat. No. 8,652,677.

(30) Foreign Application Priority Data

Jul. 9, 2007 (DE) .................. 10 2007 031 860

(51) Int. Cl.
    *H01M 6/42* (2006.01)
    *H01M 2/20* (2006.01)
    *H01M 2/08* (2006.01)

(52) U.S. Cl.
    CPC ............ *H01M 2/204* (2013.01); *H01M 2/08* (2013.01)

(58) Field of Classification Search
    CPC ........ H01M 2/204; H01M 2/202; H01M 2/24; H01M 2/1016; H01M 2/1022; H01M 2/08; H01M 2220/30
    See application file for complete search history.

(56) References Cited

U.S. PATENT DOCUMENTS

| | | | | |
|---|---|---|---|---|
| 2,692,944 A | * | 10/1954 | Mendelson | ........... H01M 2/105 429/163 |
| 3,110,634 A | * | 11/1963 | Bradshaw | ............. H01M 2/105 429/160 |
| 4,145,485 A | | 3/1979 | Kinsman | |

(Continued)

FOREIGN PATENT DOCUMENTS

| | | |
|---|---|---|
| EP | 1548859 | 6/2005 |
| EP | 1780819 | 5/2007 |
| WO | WO 2005/069408 | 7/2005 |

*Primary Examiner* — Raymond Alejandro

(74) *Attorney, Agent, or Firm* — Norton Rose Fulbright US LLP; Gerard Messina

(57) ABSTRACT

A rechargeable battery (1) for hand-guided electromechanical tools, having a plurality of rechargeable battery cells (10) which are electrically connected to one another by means of electrical cell connectors (110), wherein the electrical cell connectors (110) are fixed to a cell connection frame (120), which is provided on one pole side (19) of the rechargeable battery cells (10), for the purpose of simplified mounting of the electrical cell connectors (110) on the rechargeable battery cells (10). Furthermore, an electromechanical tool, in particular a cordless screwdriver, a drill, a circular saw, a jigsaw, a sander, a garden appliance, having a rechargeable battery (1) according to the invention.

20 Claims, 3 Drawing Sheets

(56) References Cited

U.S. PATENT DOCUMENTS

| | | | |
|---|---|---|---|
| 7,846,577 B2* | 12/2010 | Kozu et al. | 429/162 |
| 8,652,677 B2* | 2/2014 | Matthias | 429/149 |
| 2006/0091891 A1* | 5/2006 | Woo et al. | 324/430 |

\* cited by examiner

RECHARGEABLE BATTERY FOR HAND-GUIDED ELECTROMECHANICAL TOOLS

CROSS-REFERENCE TO RELATED APPLICATIONS

The present application is a continuation application of U.S. patent application Ser. No. 12/668,600, filed on Jan. 11, 2010 and now U.S. Pat. No. 8,652,677, which is a national phase to International Application No. PCT/EP2008/056043, filed May 16, 2008, and claims priority to German Patent Application No. 10 2007 031 860.1, filed on Jul. 9, 2007, all of which are hereby incorporated by reference in their entireties.

BACKGROUND OF THE INVENTION

Field of the Invention

The invention relates to a rechargeable battery for hand-guided electromechanical tools, in which the rechargeable battery has many rechargeable battery cells electrically connected to one another. The invention also pertains to an electromechanical tool having a rechargeable battery according to the invention.

Description of the Prior Art

All hand-guided, portable, electrically operated hand tools in which a motor is a usually inseparable component of the tool are called electromechanical tools. Examples are power drills, rechargeable battery cells, circular and saber saws, right-angle sanders, and other power sanders, as well as various garden tools, depending on the design, such as electric hedge shears. Rechargeable batteries or nonrechargeable batteries for such tools should have the highest possible capacity, and a sturdy construction that resists even relatively strong impacts, and should be capable of being produced both simply and furthermore economically.

Electrical connections of rechargeable battery cells or battery pack cells inside a rechargeable battery are embodied in the prior art by way of separate cell connections. As a result, particularly with rechargeable batteries that have many rechargeable battery cells, the effort of assembly is high and there are problems in positioning the cell connections. If the electric cell connections are not prefixed by means of a separate device frame or held on the rechargeable battery cells by means of clamping or retaining elements before welding to the poles of the rechargeable battery cells is done, then geometric imprecisions can result in positioning the cell connections. This leads to quality problems with the rechargeable batteries, and in later use, the likelihood of failure of the rechargeable battery can be increased.

German Patent DE 100 03 740 C1 discloses a battery with a heat dissipator, and a plurality of battery cells are interconnected with one another in the battery. These battery cells are connected in parallel, and each three battery cells are connected electrically by means of a cell connector and form a battery cell packet. The batter cell packets of the battery are electrically connected by means of current bridges and connected in series. The electrical cell connection and current bridges are each provided separately inside the battery. For dissipation of heat generated in the battery, a flat cooling plate is provided on at least one face end of the battery and is at least indirectly in thermal contact with the cell connections and the current bridges.

OBJECT AND SUMMARY OF THE INVENTION

It is one object of the invention to disclose an improved rechargeable battery. In particular, it is an object of the invention on the one hand to dispense with (pre-fixation of the separate electrical cell connections on the rechargeable battery cells, without having to accept sacrifices in quality in the production of the rechargeable battery. It is furthermore an object of the invention to disclose a robust, economical rechargeable battery that furthermore should be capable of being produced quickly. It is moreover an object of the invention to realize an electromechanical tool having a rechargeable battery of the invention.

According to the invention, for simplified, faster and more-economical assembly of the rechargeable battery, an electrical cell connector for rechargeable battery cells of the rechargeable battery is affixed to a cell connection frame, which is preferably of plastic and which can be provided on one pole side of the rechargeable battery. The electrical cell connector and the cell connection frame form the cell connection according to the invention by means of which the rechargeable battery cells can be connected electrically. Preferably, the cell connection frame is spray-coated or coated from behind on the cell connection or cell connections.

According to the invention, the separate cell connections that are usual in the prior art are preferably connected to one another by a plastic spray-coating in the form of a frame, thus creating an integrated component comprising a plurality of cell connections and the cell connection frame.

As a result, the effort and expense in rechargeable battery assembly in particular is reduced, and constant quality of the welded connections of the individual rechargeable battery cells to the electrical cell connectors is guaranteed, since the cell connection frame can be positioned exactly on a cell cluster of the rechargeable battery. Because of the ease of assembly of the cell connection according to the invention, secure electrical cell connectors are obtained with little fluctuation in quality. As a result, the rechargeable battery and the cell connection is inexpensive, economical, and reliable. The cell connection of the invention is well designed with regard to temperature performance and electrical insulation performance. The cell connection is furthermore safe and reliable because of influence on the geometry of its cell connection frame, since this frame can be adapted to requirements inside the rechargeable battery.

The cell connection according to the invention preferably has rectangular or circular through recesses, on or in which contact portions of the electrical cell connectors are disposed. These through recesses, in an assembled cell connection, are disposed on or above the poles of the rechargeable battery cells of the rechargeable battery. The applicable contact portion for a welding tool, in particular a welding electrode, is accessible through the respective through recess, and as a result, a pole of a rechargeable battery cell can be welded to the applicable contact portion.

In preferred embodiments of the invention, the electrical cell connectors has a curved transitional portion, and the contact portions of the cell connection can be seated resiliently on the poles of the rechargeable battery cell. This simplifies welding of the contact portions to the applicable poles. In the case of flat cell connectors, it is naturally possible for the contact portions also to be embodied as spring contacts.

By means of protrusions and/or recesses, for instance, on the side of the cell connection frame that faces toward the poles of the rechargeable battery cells, the cell connection of the invention can be positioned on the rechargeable battery cells. In other words, by means of a fastening portion formed integrally onto or into the cell connection frame, it is possible to position the cell connection frame quickly and simply on the rechargeable battery cells. Next, the contact portions of the electrical cell connectors are welded to the poles of the rechargeable battery cells. In embodiments of the invention, the cell connection can be locked, clipped or glued to one or a plurality of rechargeable battery cells and/or to a housing of the rechargeable battery.

In the cell connection of the invention, the cell connections can furthermore be secured or provided intermittently inside the cell connection frame, and/or the cell connections can intermittently be flush with an outside of the cell connection. In the latter embodiment, space is usually saved compared with the first one mentioned. The plain portions of the cell connections can be electrically insulated from a housing of the rechargeable battery or separately.

BRIEF DESCRIPTION OF THE DRAWINGS

The invention will be described in further detail below in terms of exemplary embodiments, in conjunction with the accompanying drawings. In the drawings.

DESCRIPTION OF THE PREFERRED EMBODIMENTS

Figure 1:
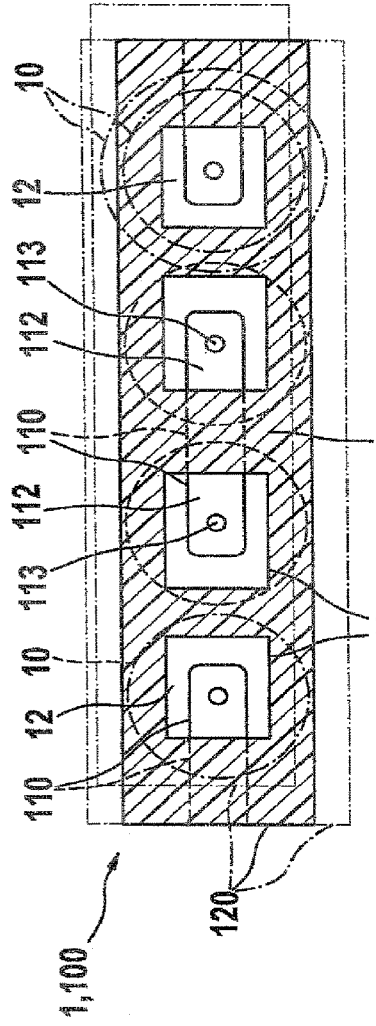
FIG. 1 shows a first embodiment of a cell connection according to the invention in a top view.

The invention is described in further detail below in terms of a rechargeable battery for hand-guided electromechanical tools. However, the invention not meant to be limited to such hand-guided tools but instead pertains to rechargeable batteries in general. For instance, the invention can be employed with rechargeable batteries for motor vehicles that have internal combustion engines or drive systems of electric motor vehicles. It is also possible for instance to use the invention for rechargeable batteries for portable electronic devices, drives, such as drives for constructing models, and in cell phones, cameras, and the like.

When the term "cell connector" is used hereinafter, it is meant to include the term cell terminal for one pole of the rechargeable battery; that is, the invention also pertains to that portion of a rechargeable battery at which the cell connection, in the form of a rechargeable battery pole, is visible on an outside of the rechargeable battery. Dashed lines in the drawings also designate edges that cannot be seen. Conversely, dot-dashed lines represent optional or additional embodiments of the invention.

Figure 2:
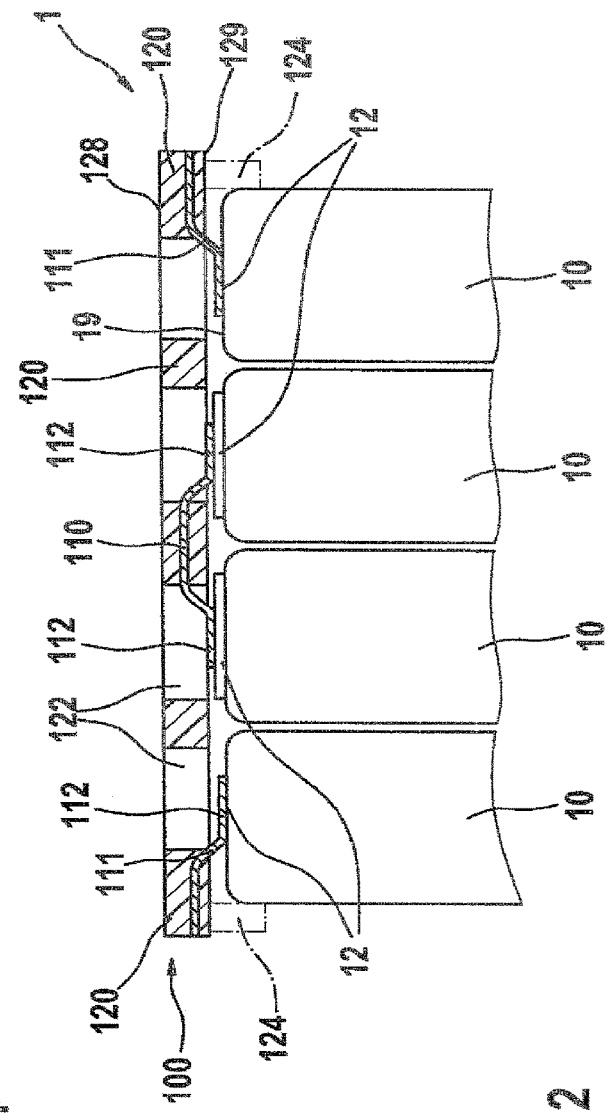
FIG. 2 shows the cell connection of FIG. 1 in an assembled state on a plurality of rechargeable battery cells, in a partly sectional side view.

FIGS. 1 and 2 show a rechargeable battery 1 which can also be embodied as a rechargeable battery train or rechargeable battery packet or a nonrechargeable battery. A housing of the rechargeable battery 1 is not shown. The rechargeable battery 1 has four rechargeable battery cells 10, and an electrical connection of two rechargeable battery cells 10 is effected via an electrical cell connector 110. It is understood to be possible to provide the rechargeable battery 1 with one more or fewer rechargeable battery cells 10, and to connect them electrically in series or parallel as needed.

The electrical cell connectors 110, preferably embodied in flat and preferably striplike form, are provided on one pole side 19 of the rechargeable battery cells 10 of the rechargeable battery 1. The electrical cell connectors 110 are disposed in part on and/or inside a cell connection frame 120. That is, the cell connection frame 120 and the electrical cell connectors 110 are combined into one component. The cell connection frame 120 here comprises an electrical insulating material and is preferably made from a plastic. In particular, the cell connection frame 120 is integrally injected, or spray-coated, or spray-coated from behind, onto the individual electrical cell connectors 110 by means of an injection molding process.

The electrical cell connectors 110 and the cell connection frame 120 of the invention together yield the cell connection 100 of the invention, which is seated on the pole side 19 of the rechargeable battery cells 10. Contact portions 112 of the electrical cell connectors 110 each contact the rechargeable battery cells 10 at a respective electrical pole 12. Preferably, the contact portions 112 are welded to the respective pole 12, preferably spot-welded. However, it is also possible to make an electrical contact of a contact portion 112 with the applicable pole 12 in some other way, which can even be done only via spring forces, for instance. Weld spots 113 connecting the contact portions 112 to the, poles 12 can be seen in FIGS. 1 and 4.

Particularly if the contact portions 112 are to be welded to the poles 12, the cell connection frame 120 has through recesses 122, so that a welding tool (welding horn, electrode, sonotrode) can reach the vicinity of a contact portion 112 that is to be welded to the applicable pole 12. For that purpose, the through recesses 122 are provided on or in a region of the cell connection frame 120 on or in which the contact portions 112 of the electrical cell connectors 110 are provided. The through recesses 122 are circular, elliptical or rectangular, for instance, but arbitrary shapes of the through recesses 122 can of course be used as well. If welding of the contact portions 112 to the poles 12 is dispensed with, then the through recesses 122 can be left out, and the cell connection 100 can form part of the housing of the rechargeable battery 1.

In the exemplary embodiment shown in FIG. 2, the electrical cell connectors 110 are secured by one portion inside the cell connection frame 120. The region of the electrical cell connector 110 located in the vicinity of the through recess 122 is preferably guided in a region of the through recess 122 via a curved transitional portion 111. In this respect it is preferable for curved transitional portion 111 to guide the contact portion 112 of the electrical cell connector 110 in a region below an underside 129 of the cell connection frame 120. In other words, the free contact portions 112 of the applicable electrical cell connectors 110 protrude from the underside 129 or outside of the cell connection frame 120. The contact portions 112 are located parallel to the underside 129 and preferably also parallel to a top side 128 of the cell connection frame 120.

To compensate for a difference in height among the rechargeable battery cells 10, the various contact portions 112 are disposed in two planes parallel to one another. However, in other embodiments of the invention, it is possible for all the contact portions 112 of the electrical cell connectors 110 to be disposed in one plane, in which case the applicable poles 12 of the rechargeable battery cells 10 are then also disposed in one plane.

In FIG. 1, it can be seen that the cell connection 100 or the cell connection frame 120 is aligned with both its long sides with the rechargeable battery cells 10, and as can also be seen in FIG. 2, with its two transverse sides it extends beyond the respective lateral rechargeable battery cell 10.

However, it is also possible to select other configurations. For instance, it is possible for the transverse and long sides of the cell connect on frame 120 to be aligned with the rechargeable battery cells 10 or protrude into it or beyond it (in top view). It is also possible to dispose the cell connection frame 120 asymmetrically or partly symmetrically with respect to the rechargeable battery cells 10. This is indicated in part by the embodiments shown in dashed lines in FIG. 1. FIG. 1 also shows a rechargeable battery cell 10 that is enlarged compared with the rechargeable battery cells 10 shown in FIG. 2.

To simplify "centering" or preassembly of the cell connection 100 on the rechargeable battery cells 10, the cell connection 100 can have assembly protrusions 124 on its underside 129 facing toward the rechargeable battery cells 10. These protrusions are shown in dot-dashed lines in FIG. 2. A plurality of assembly protrusions 124 (see also FIG. 4) may be provided. It is moreover possible to provide only one assembly protrusion 124, which in the assembled state extends all the way around or only partway around the rechargeable battery cells 10 of the rechargeable battery 1.

Figure 3:
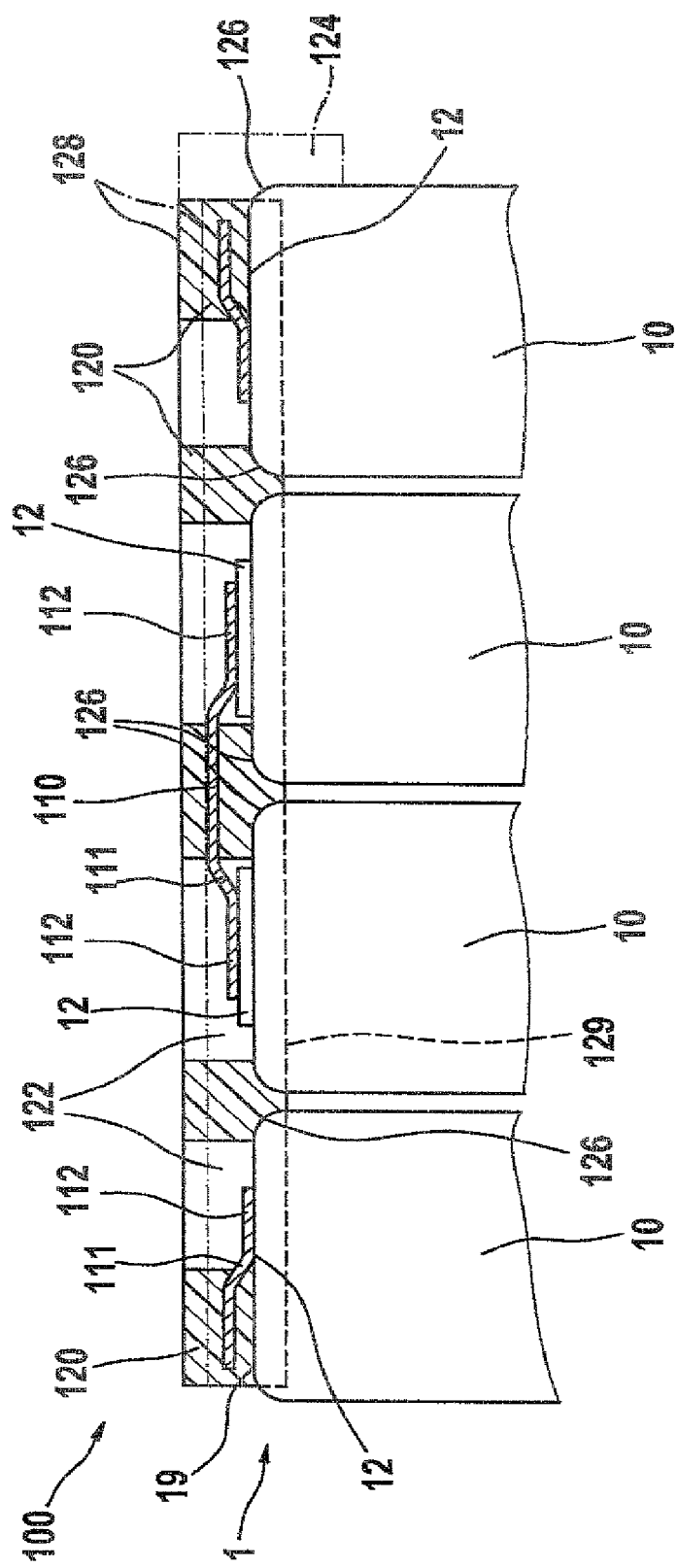
FIG. 3 shows a second embodiment of the cell connection of the invention in an assembled state on a plurality of rechargeable battery cells, in a partly sectional side view.

Another possibility of providing the cell connection 100 according to the invention on the rechargeable battery cells 10 is shown in FIG. 3. Here the contact portions 112 of the electrical cell connectors 110 protrude into the corresponding through recesses 122 of the cell connection frame 120. In other words, the electrical cell connectors 110 are disposed entirely inside an outer boundary of the cell connection frame 120. Correct seating of the cell connection 100 on the rechargeable battery cells 10 is effected by means of recesses 126, which are provided in the cell connection frame 120. The recesses 126 trace the applicable portions of the rechargeable battery pack cells 10, so that protrusions formed by the recesses 126 come to rest in free spaces between two or four rechargeable battery cells 10. As shown in FIG. 3, the cell connection 100 according to the invention may be embodied as overall shorter than the rechargeable battery cells 10 disposed side by side. FIG. 3 furthermore shows an embodiment of the invention with an assembly protrusion 124 which is provided on one long end of the cell connection frame 120 and which in the assembled state conforms to one or a plurality of rechargeable battery cells 10.

FIG. 3 furthermore shows an embodiment in which a top side 128 (in dot-dashed lines) of the cell connection frame 120 is aligned with at least one electrical cell connector 110 (FIG. 3, top center). Naturally, it is also possible for a plurality of electrical cell connectors 110, or all of them, to be aligned by at least one portion with the top side 128 of the cell connection frame 120 (this is not shown in the drawing). In such embodiments of the invention, it is preferable that the electrical cell connectors 110, in those portions on which they have material contact with the cell connection frame 120, have corresponding recesses, preferably through recesses, into which the fluid plastic can flow in the spray-coating process, so as to affix the electrical cell connectors 110 to the cell connection frame 120. Naturally, it is also possible for this to be done only later upon assembly of the electrical cell connectors 110 on an already-completed cell connection frame 120.

Figure 4:
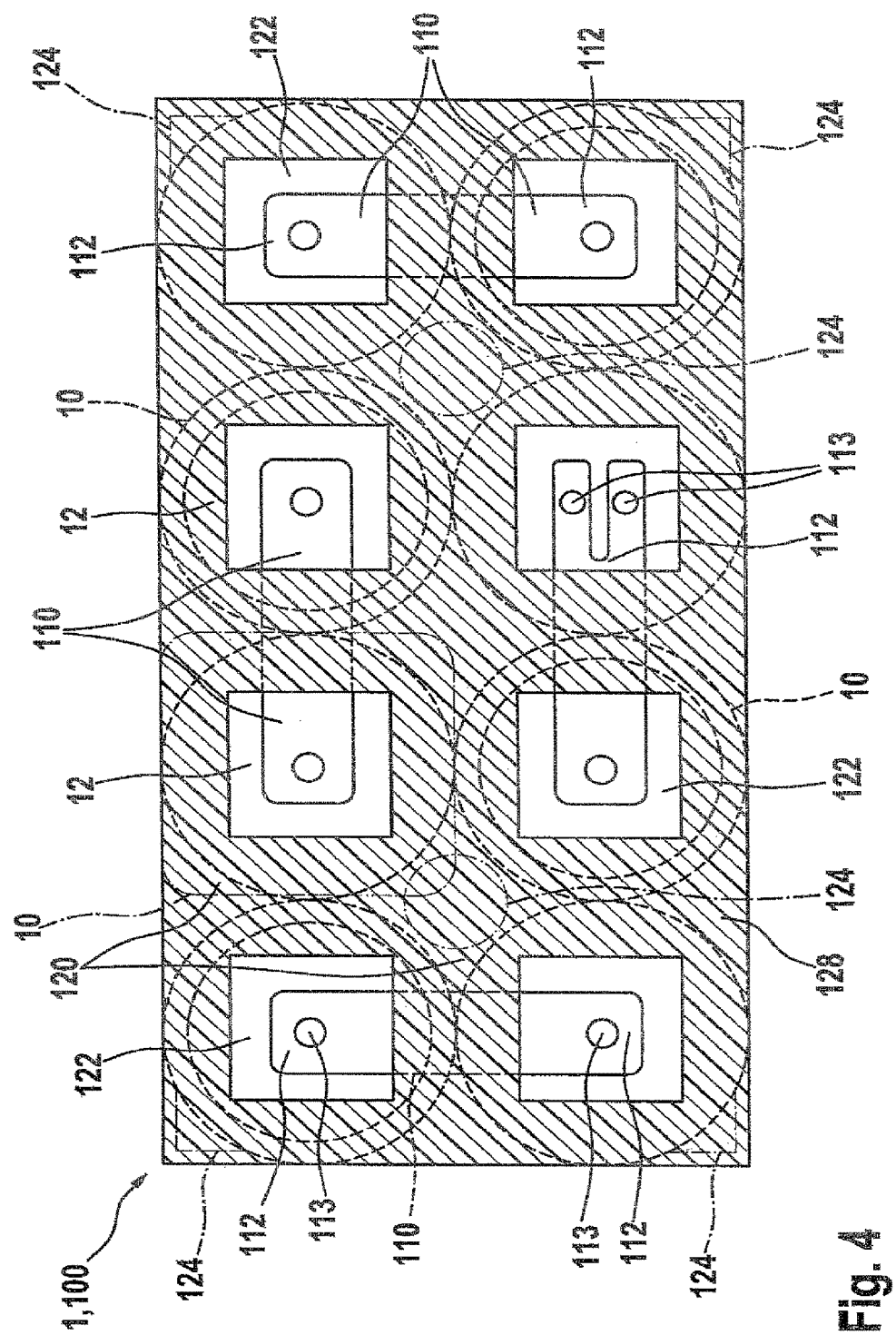
FIG. 4 shows a third embodiment of the cell connection of the invention, in a top view.

FIG. 4 shows an embodiment of the cell connection 100 according to the invention in which two rows each of four rechargeable battery cells 10 are connected electrically in series to one another. This can be seen from the arrangement of the poles 12 of the rechargeable battery cells 10. A cell connection 100 according to the invention located opposite that face end then connects the rechargeable battery cells 10 not shown in FIG. 4 accordingly. That side then also has the poles 12 of the rechargeable battery 1. In all the embodiments of the invention, it is possible for this side of the rechargeable battery 1 to be electrically interconnected with conventional cell connections.

FIG. 4 furthermore shows an alternative preferred electrical contact portion 112 (FIG. 4, bottom center), which has two tongues, and each tongue is connected electrically to the pole 12 of the rechargeable battery cell 10 by means of a weld spot 113; the two tongues are separated from one another via a gap. FIG. 4 furthermore shows an alternative rechargeable battery cell 10 in its cross section, which is constructed as approximately square or nearly rectangular. As a result, the space inside the rechargeable battery 1 can be utilized more effectively.

FIG. 4 furthermore shows alternative assembly protrusions 124. On the one hand, one such assembly protrusion 124 is provided in all four corner regions of the cell connection frame 120. Alternatively or in addition, it is possible to provide the assembly protrusions 124 in a middle region of the cell connection frame 120. This is shown as an example by means of two peglike assembly protrusions 124.

The invention is of course also usable with only a single electrical cell connector 110 that connects two rechargeable battery cells 10 to one another. In that case, the cell connection frame 120 is preferably embodied as a land between the two contact portions 112 of the electrical cell connector 110.

The foregoing relates to the preferred exemplary embodiments of the invention, it being understood that other variants and embodiments thereof are possible within the spirit and scope of the invention, the latter being defined by the appended claims.

What is claimed is:

1. A rechargeable battery for hand-guided electromechanical tools, comprising:
a plurality of rechargeable battery cells electrically connected to one another via electrical cell connectors, wherein the electrical cell connectors include:
two curved transitional portions; and
a straight portion disposed between, and connecting, the two curved transitional portions,
wherein, for mounting of the electrical cell connectors on the plurality of rechargeable battery cells, the electrical cell connectors are fixedly connected to a cell connection frame by injection-molding the cell connection frame to the electrical cell connectors to form an integrated component,
wherein the cell connection frame entirely surrounds an uppermost side of the straight portion of the electrical cell connectors.

2. The rechargeable battery as defined by claim 1, wherein electrical contact portions of the electrical cell connectors are provided on or in through recesses of the cell connection frame or protrude at least partway into them, and a through recess is disposed on/above one pole of a rechargeable battery cell of the plurality of rechargeable battery cells.

3. The rechargeable battery as defined by claim 1, wherein a contact portion adjoining the curved transitional portions is disposed on a pole of a rechargeable battery cell of the plurality of rechargeable battery cells.

4. The rechargeable battery as defined by claim 1, wherein one side, which is oriented toward the plurality of rechargeable battery cells, of the cell connection frame has protrusions and/or recesses, by means of which the cell connection frame is positioned on the plurality of rechargeable battery cells.

5. The rechargeable battery as defined by claim 1, wherein the cell connection frame is locked to at least one rechargeable battery cell of the plurality of rechargeable battery cells and/or a housing of the rechargeable battery.

6. The rechargeable battery as defined by claim 1, wherein the electrical cell connectors is provided with one portion inside the cell connection frame.

7. The rechargeable battery as defined by claim 1, wherein one portion of at least one of the electrical cell connectors is flush with a surface of the cell connection frame which is situated away from the pluraility of rechargeable battery cells.

8. The rechargeable battery as defined by claim 1, wherein the cell connection frame is embodied in one piece.

9. The rechargeable battery as defined by claim 1, wherein the cell connection frame has through recesses, on or in which contact portions of the electrical cell connectors are disposed.

10. The rechargeable battery as defined by claim 9, wherein the through recesses are on or above poles of the plurality of rechargeable battery cells.

11. The rechargeable battery as defined by claim 1, wherein the curved transitional portions are adapted to allow the contact portions of the electrical cell connectors to be seated resiliently on poles of the plurality of rechargeable battery cells.

12. The rechargeable battery as defined by claim 11, wherein the curved transitional portions guide the contact portions of the electrical cell connectors in a region below an underside of the cell connection frame.

13. The rechargeable battery as defined by claim 9, wherein the contact portions of the electrical cell connectors protrude into the through recesses such that the contact portions are disposed within an outer boundary of the cell connection frame.

14. The rechargeable battery as defined by claim 1, wherein the cell connection frame includes a fastening portion configured to position the cell connection frame on the plurality of rechargeable battery cells, said fastening portion is formed in one piece with the cell connection frame.

15. The rechargeable battery as defined by claim 1, wherein the cell connection frame includes at least one protrusion configured to position the cell connection frame on the plurality of rechargeable battery cells, said protrusion being disposed on a side of the cell connection frame that faces toward poles of the plurality of rechargeable battery cells.

16. The rechargeable battery as defined by claim 1, wherein the cell connection frame includes at least one recess configured to position the cell connection frame on the plurality of rechargeable battery cells, said recess being disposed on a side of the cell connection frame that faces toward poles of the plurality of rechargeable battery cells.

17. The rechargeable battery as defined by claim 1, wherein the electrical cell connectors are injection-molded to the cell connection frame such that a portion of at least one of the electrical cell connectors is embedded in the cell connection frame.

18. The rechargeable battery as defined by claim 1, wherein the electrical cell connectors are injection-molded to the cell connection frame such that a bare portion of at least one of the electrical cell connectors is disposed on an outside of the cell connection frame.

19. The rechargeable battery as defined by claim 1, wherein the cell connection frame has side faces which protrude beyond the plurality of rechargeable battery cells.

20. The rechargeable battery as defined by claim 1, wherein at least a portion of the cell connection frame is provided on a pole side of the plurality of rechargeable battery cells.

* * * * *